US011683400B1

(12) United States Patent
Wessendorf et al.

(10) Patent No.: US 11,683,400 B1
(45) Date of Patent: Jun. 20, 2023

(54) COMMUNICATION PROTOCOL FOR KNATIVE EVENTING'S KAFKA COMPONENTS

(71) Applicant: Red Hat, Inc., Raleigh, NC (US)

(72) Inventors: Matthias Wessendorf, Grasbrunn (DE); Pierangelo Di Pilato, Milan (IT); Ahmed Abdalla Ibrahim Abdelrehim, Grasbrunn (DE); Ali Ok, Ankara (TR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/685,637

(22) Filed: Mar. 3, 2022

(51) Int. Cl.
*H04M 1/64* (2006.01)
*H04L 69/18* (2022.01)
*H04L 67/02* (2022.01)

(52) U.S. Cl.
CPC .............. *H04L 69/18* (2013.01); *H04L 67/02* (2013.01)

(58) Field of Classification Search
CPC ..... H04L 69/18; H04L 41/0897; H04L 67/02; H04L 67/1029; G06F 9/45558
See application file for complete search history.

(56) References Cited

U.S. PATENT DOCUMENTS

| | | | |
|---|---|---|---|
| 7,010,609 B1 | 3/2006 | Black et al. | |
| 7,590,644 B2 * | 9/2009 | Matsakis | G06F 8/41 715/239 |
| 7,949,704 B2 | 5/2011 | Jones et al. | |
| 8,331,351 B2 | 12/2012 | Gilfix et al. | |
| 8,386,577 B2 | 2/2013 | Hickson et al. | |
| 11,100,027 B1 * | 8/2021 | Wigmore | G06F 13/1668 |

(Continued)

FOREIGN PATENT DOCUMENTS

CN 109450936 A 3/2019

OTHER PUBLICATIONS

Aitor Arjona, Pedro García López, Josep Sampé, Aleksander Slominski, Lionel Villard, Triggerflow: Trigger-based orchestration of serverless workflows, Future Generation Computer Systems, vol. 124, 2021, pp. 215-229, ISSN 0167-739X,https://doi.org/10.1016/j.future.2021.06.004. (Year: 2021).*

(Continued)

*Primary Examiner* — Chirag R Patel
(74) *Attorney, Agent, or Firm* — Womble Bond Dickinson (US) LLP

(57) ABSTRACT

Systems and methods are described for passing event messages between components of a computing cluster. An example method includes obtaining, at an event sender, a record that contains an event, wherein the event sender is a data storage component of an event streaming platform. The method also includes identifying a receiving component that is designated as a receiver for the record, and determining, by a processing device, whether the receiving component is a native protocol aware component, wherein the native protocol is native to the event streaming platform. Upon determining that the receiving component is a native protocol aware component, the record is sent to the receiving component using the native protocol. Upon determining that the receiving component is not a native protocol aware component, the record is sent to the receiving component using Hyper Text Transfer Protocol (HTTP).

20 Claims, 5 Drawing Sheets

(56) References Cited

U.S. PATENT DOCUMENTS

| | | | |
|---|---|---|---|
| 2006/0146991 A1* | 7/2006 | Thompson | H04L 51/214 379/67.1 |
| 2007/0067389 A1 | 3/2007 | Bedi et al. | |
| 2017/0147691 A1* | 5/2017 | Li | G06F 16/951 |
| 2021/0243266 A1 | 8/2021 | Rahman et al. | |

OTHER PUBLICATIONS

J. Dizdarević and A. Jukan, "Experimental Benchmarking of HTTP/QUIC Protocol in IoT Cloud/Edge Continuum," ICC 2021—IEEE International Conference on Communications, 2021, pp. 1-6, doi: 10.1109/ICC42927.2021.9500675. (Year: 2021).*

Paolo Patierno, Exposing your Apache Kafka cluster through the HTTP bridge, Strimzi, Nov. 5, 2019, pp. 1-15. (Year: 2019).*

Cloud Events, Cloud Events Format, https://web.archive.org/web/20211205103510/https://cloud.google.com/events, Dec. 3, 2021, pp. 1-4. (Year: 2021).*

Chappell, David A., Enterprise Service Bus, Chapter 5. "Message Oriented Middleware (MOM)", O'Reilly Media Inc., 2022, 3 pages.

Tai, Stefan, et al., "Using Message-Orientated Midddleware For Reliable Web Services Messaging", IBM T.J. Watson Center Hawthorne, New York, USA, Jun. 2003, 16 pages.

* cited by examiner

COMMUNICATION PROTOCOL FOR KNATIVE EVENTING'S KAFKA COMPONENTS

TECHNICAL FIELD

Aspects of the present disclosure relate to cloud computing systems, and more particularly, to a communication protocol implemented in a serverless computer cluster.

BACKGROUND

Serverless computing, often referred to as functions as a service, is a cloud computing model in which the cloud provider dynamically manages the allocation of the cloud system's computing resources for computing functions. A serverless computing system allows a developer to deploy code on the system, while handing the scaling, capacity planning and maintenance operations of running the code and hiding such operations from the developer. The deployed code may respond to events that originate from anywhere, including outside the system and the system handles the scaling/provisioning of resources to allow the code to respond to such events.

Knative is a software framework that adds components for deploying, running, and managing serverless applications to Kubernetes, which is a platform for managing containerized workloads and services. Apache Kafka is a popular open-source distributed event streaming platform. Distributed stream processing systems often involve the use of geographically distributed architectures for processing large data streams in real time to increase efficiency and reliability of the data ingestion, data processing, and the display of data for analysis. Knative supports various use-cases for Kafka by offering various components that facilitate communication between Kafka components. Stream processing systems such as Kafka may be implemented in a variety of architectures including, for example, the Red Hat™ OpenShift™ platform built around Kubernetes.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
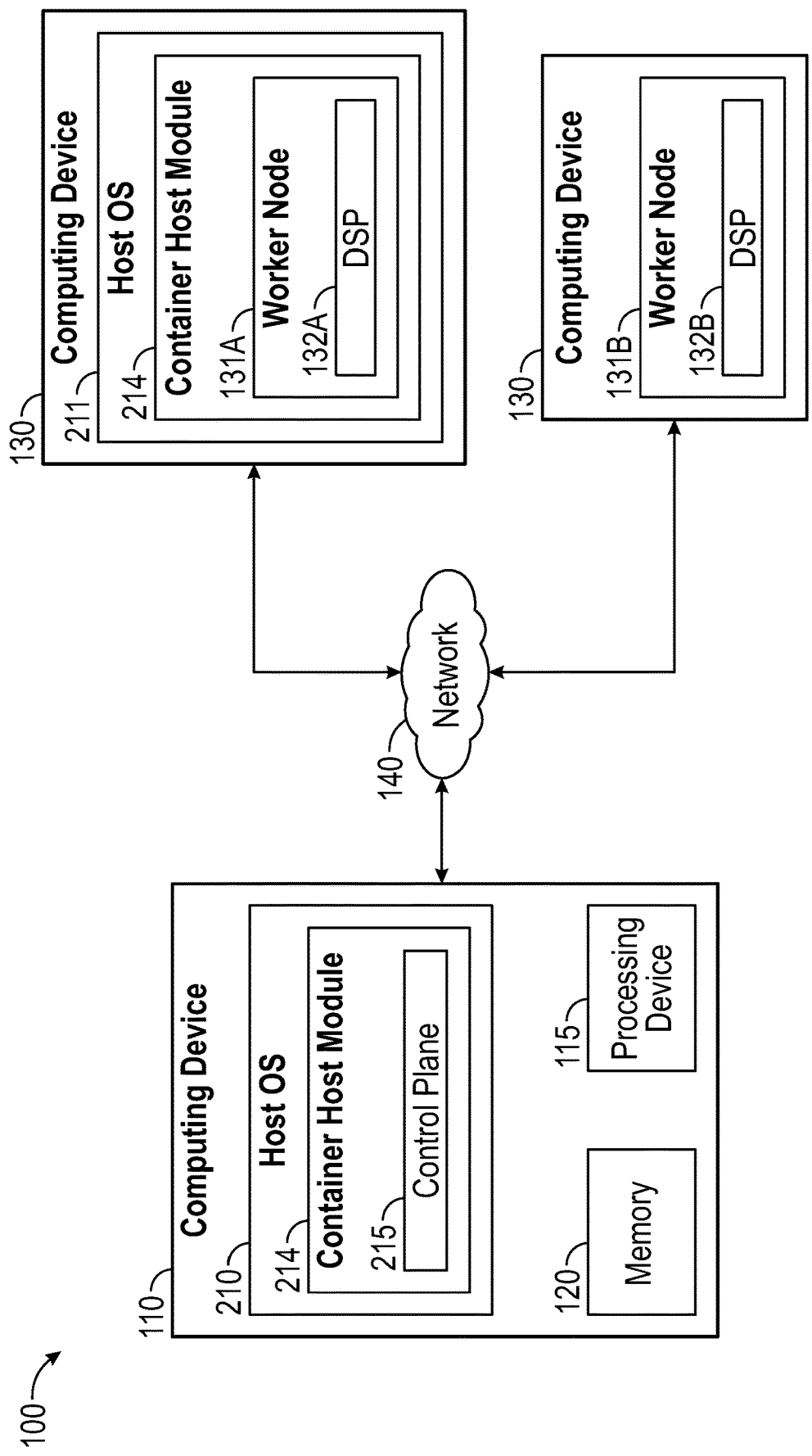
FIG. 1 is a block diagram that illustrates an example system, in accordance with some embodiments of the present disclosure.

Kubernetes is a container orchestration system for automating software development, scaling, and management. Kubernetes provides for the creation and management of a software containers in a distributed computer system that may span multiple computing systems which may be geographically remote. Each software container may operate as a member of a compute cluster and appear as an individual processing unit of the cluster.

Knative is a software architecture that can be integrated into a Kubernetes system to make some creation and management functions of the Kubernetes infrastructure transparent to developers, thereby improving the ease of use. Knative allows serverless applications to be deployed and run on any Kubernetes platform, including Red Hat OpenShift Container Platform. Knative provides various software tools that enable programming and deployment of software to a Kubernetes cluster. For example, Knative includes services that enable communication between different types of Kafka components using the Knative Eventing specification.

In the Kafka architecture, data is stored as key-value messages in what are known as topics. Kafka can be configured to run on a cluster of multiple servers and topics can be replicated across multiple nodes of the cluster. This allows Kafka to be fault tolerant and to handle a large amount of message traffic. Communication between components of the kafka architecture is based on a binary TCP protocol, which is highly efficient and uses the concept of a "message set" to group messages together.

The Knative Eventing specification defines a set of components that communicate with each other, using the Hyper Text Transfer Protocol (HTTP). The specification requires the minimum support of HTTP, but it does not explicitly prevent components from supporting other protocols, for other reasons. HTTP is also used for Kafka components, when they are wired together. Accordingly, Kafka messages traveling between the Kafka streaming platform and HTTP undergo a translation process, which adds time and consumes processing resources.

Embodiments of the present disclosure provide techniques for directly leveraging the binary Kafka protocol for sending the Kafka messages throughout the entire system data plane in a Knative architecture. In accordance with the present techniques, when a Kafka component sends a message, it first determines whether the receiving component is also a Kafka component. If not, the sender Kafka component sends the message through the HTTP protocol. If the receiving device is also a Kafka component, the sender Kafka component skips the HTTP hops and sends the message directly to the receiving component's Kafka topic in the binary Kafka protocol. Skipping the HTTP hops means that the message is not translated between protocols, which saves time and results in reduced resource utilization. Additionally, the latency of forwarding and receiving events is reduced. The techniques described herein may also result in reduced monetary cost to customers of the who are often charged based on network throughput.

FIG. 1 is a block diagram that illustrates an example system in accordance with some embodiments of the present disclosure. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network.

The network 140 may carry communications (e.g., data, message, packets, frames, etc.) between computing device 110 and computing devices 130. Each computing device 110 and 130 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.—not shown), and other hardware devices (e.g., sound card, video card, etc. —not shown). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation.

Each of computing device 110 and computing devices 130 may execute or include an operating system (OS) such as host OS 210 and host OS 211 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a worker node (e.g., as part of the container orchestration engine).

In some embodiments, a container orchestration engine 214 (referred to herein as container host 214), such as the Red Hat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 214 provides a function-based architecture of smaller, decoupled units that work together.

By their nature, containerized applications are separated from the operating systems where they run and, by extension, their users. The control plane 215 may include a Kubernetes API server that exposes applications to internal and external networks by defining network policies that control communication with containerized applications (e.g., incoming HTTP or HTTPS requests for services inside the cluster). The core Kubernetes API server may also be extended by additional custom software definitions that may be provided by the user. For example, a background program referred to herein as a reconciler may be configured to leverage the Kubernetes API server to create, update, and delete cluster resources such as Kafka sources, Kafka channels, and others. The reconciler is configured to compare a desired state with actual state of the cluster, and if there is a difference then triggers changes to move the actual state to the configured state.

A typical deployment of the container host 214 may include a control plane 215 and a cluster of worker nodes 131, including worker nodes 131A and 131B (also referred to as compute machines). The control plane 215 may include REST APIs which expose objects as well as controllers which read those APIs, apply changes to objects, and report status or write back to objects. The control plane 215 manages workloads on the worker nodes 131 and also executes services that are required to control the worker nodes 131.

The cluster of worker nodes 131 are where the actual workloads requested by users run and are managed. The worker nodes 131 advertise their capacity and a scheduler (not shown), which is part of the control plane 215, determines which worker nodes 131 containers and pods will be started on. Each worker node 131 includes functionality to accept and fulfill requests for running and stopping container workloads, and a service proxy, which manages communication for pods across worker nodes 131. A worker node 131 may be implemented as a virtual server, logical container, or GPU, for example.

One type of application that the container host 214 may run is a data streaming platform 132A (hereinafter referred to as "DSP 132A"), such as Apache Kafka™. The DSP 132A may publish, subscribe to, store, and process streams of records in real time. The DSP 132A may handle data streams from multiple sources and deliver them to multiple clients. The DSP 132A may be built into streaming data pipelines that share data between systems and/or applications of the container host 214, and may also be built into the systems and applications of the container host 214 that consume that data. In some embodiments, the DSP 132A may integrate with the container host 214 to provide data integration among other functionality.

Figure 2:
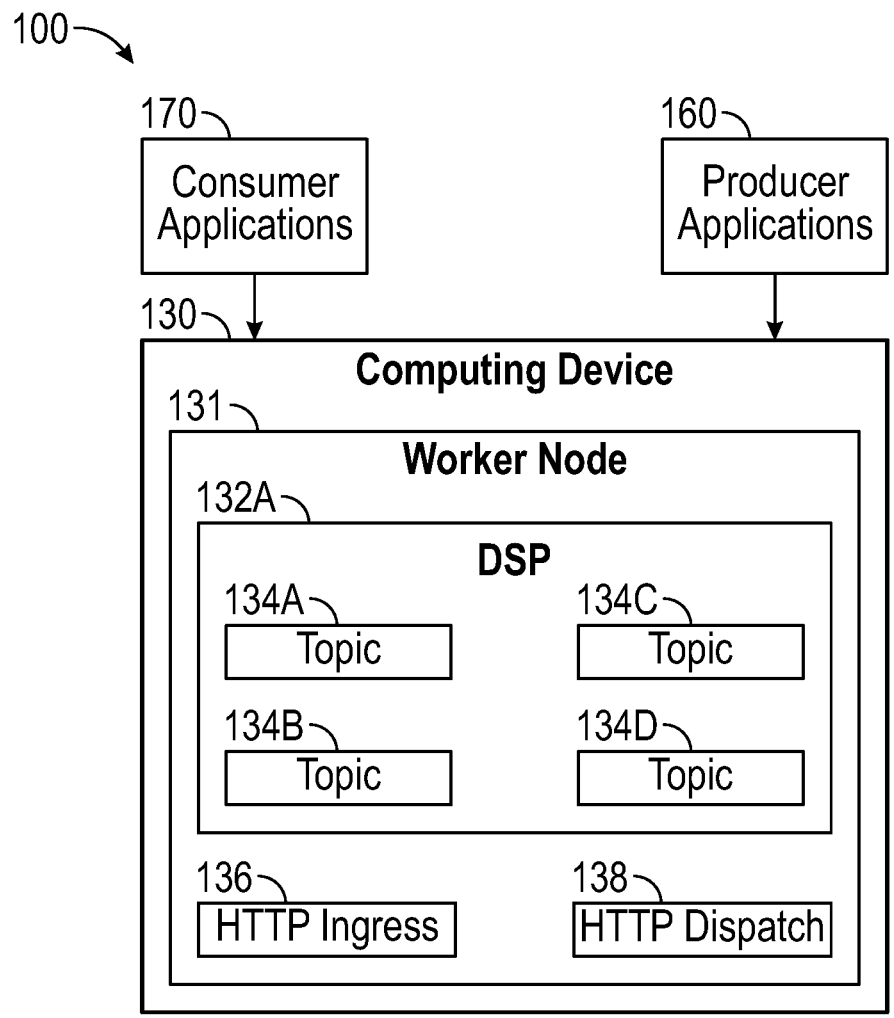
FIG. 2 illustrates additional details of the system 100 in accordance with some embodiments of the present disclosure.

FIG. 2 illustrates additional details of the system 100 in accordance with some embodiments of the present disclosure. Computing device 130 may host the DSP 132, which may be organized into a plurality of topics 134A-134D. A topic may be a data pipeline that represents a category/feed name to which records are stored and published. The records of the DSP 132 may be organized into the topics 134A-134D. The data stored to the topics 134 may be replicated across several worker nodes 131. Producer applications 160 may write data to topics 134 and consumer applications 170 may read data from topics 134. Applications may connect to the DSP 132 and transfer a record onto a topic 134. A record can include any kind of information such as information about an event that has happened on a website, or an event that is supposed to trigger another event. Another application may connect to the DSP 132 and process or re-process records from a topic 134. The producer applications 160 and consumer applications 170 may be applications running in containers operating one or more additional worker nodes 131.

Each topic may be associated with a unique address that allows it to be accessed by other services. For example, each topic may be a Kubernetes API resource, which is assigned a unique Internet Protocol (IP) address within the cluster of worker nodes 131 and points to a storage location of the topic.

Communication between topics 134, consumer applications 170, and producer applications 160, may be performed according to the Knative eventing specification, which defines a set of components that communicate with each other using HTTP. The worker node 131 can include an HTTP ingress service for receiving HTTP messages directed to specific topics, and a HTTP dispatch service for preparing HTTP messages to be delivered. The HTTP dispatch service and HTTP ingress service may be deployed as a container or pod that exposes a service for sending or receiving network traffic to facilitate communication between containers. Messages passed between nodes may be formatted as events using an event specification such as CloudEvent. CloudEvent is an event specification developed by the Cloud Native Computing Foundation (CNCF) to provide a standardized process for communicating event information.

Embodiments of the present techniques provide for a communication process in which messages can be passed between Kafka components in the binary Kafka protocol rather than HTTP. In this communication process, messages can be delivered to the topics of other Kafka components directly, bypassing the HTTP dispatch and HTTP ingress hops.

Figure 3:
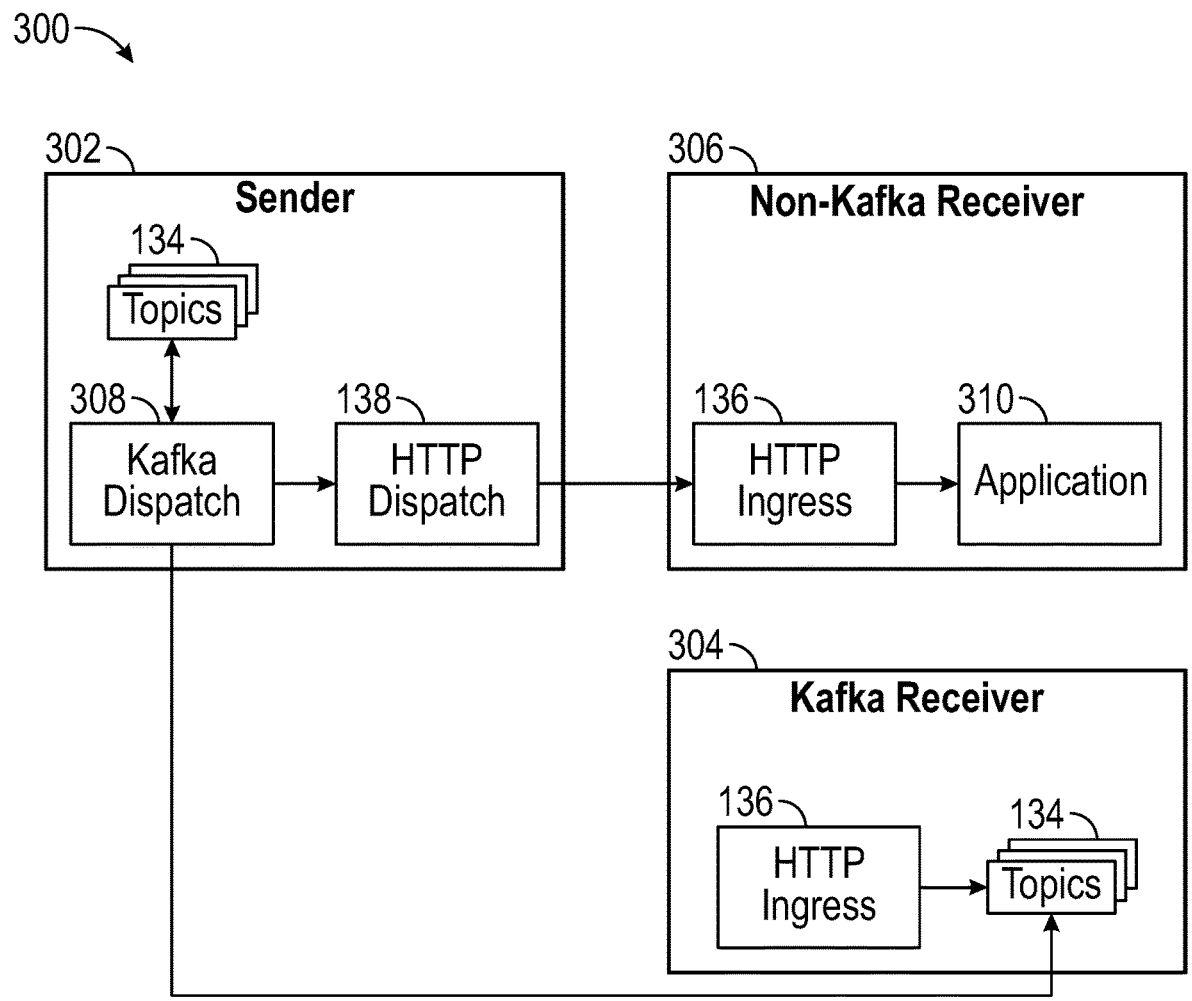
FIG. 3 is a functional block diagram illustrating a process of communicating between Kafka components in a Knative Kubernetes cluster.

FIG. 3 is a functional block diagram illustrating a process of communicating between Kafka components in a Knative Kubernetes cluster. The block diagram 300 of FIG. 3 shows communication between a sender 302 and two different types of receivers, a Kafka receiver 304, and a non-Kafka receiver 306. The Knative Eventing specification defines a set of components that can be used within Kubernetes to work with a Kafka cluster. These components include a Kafka source, a Kafka-based broker implementation, a Kafka-based channel implementation, and a Kafka sink, each of which may be configured to store a replicated version of the events to each topic. Events may be stored in the Kafka cluster as Kafka records.

The Knative Kafka source is a component that is configured access one or more topics from Apache Kafka, read the records stored to the topics, and send them as events to a referenced component. In some embodiments, the Kafka source may convert events read from the topic to a message referred to as a Cloud Event. Cloud events are event messages formatted according to the CloudEvents specification and may be sent to a receiving component via HTTP. A Kafka sink in Knative is an addressable or a callable resource that can receive incoming events from other resources and store them into a topic of the configured Apache Kafka cluster. For example, a Kafka sink may be an event consumer.

The Knative Kafka channel is an addressable resource that receives incoming events and stores them as records into a Topic of the configured Apache Kafka cluster. Any events received by a Kafka channel can be delivered to one or more destinations through a subscription API. In accordance with the subscription API, any consumers (sinks) that subscribe to the specific Kafka channel will receive any events that are received at the Kafka channel.

The Knative Kafka broker is an addressable resource that, like a Kafka channel, receives incoming events and stores them into a topic of the configured Apache Kafka cluster. Any events received by a Kafka broker can be delivered to one or more destinations through a trigger API. In accordance with the trigger API, the Kafka broker applies a filter for each one of the consumers (sinks) connected to the Kafka broker. The filter indicates the type of events that the consumer is configured to receive, and only events that satisfy the filter criteria are forwarded to the consumer. Kafka sources, Kafka brokers, Kafka channels, and Kafka sinks may be implemented as "Kubernetes native" APIs and can be configured to run as pods, software deployments, or micro-services inside of Kubernetes, depending on the design details of a particular implementation.

In the illustration shown in FIG. 3, the component referred to herein as the sender 302 may be any type of Kafka component configured to send Kafka messages, including a Kafka source, a Kafka broker, or a Kafka channel. Similarly, the component referred to herein as the Kafka receiver 304 may be any Kafka component that can be configured to receive Kafka messages, including brokers, channels, and sinks. For example, if the Kafka sender 302 is a Kafka source, the Kafka receiver 304 may be a Kafka broker or a Kafka channel, and if the Kafka sender 302 is a Kafka broker or a Kafka channel, the Kafka receiver 304 may be a Kafka sink.

The Kafka sender 302, Kafka receiver 304, and non-Kafka 306 receiver may be implemented as software running in the Kubernetes cluster of FIGS. 1 and 2, and may be implemented in one or more worker nodes 131. For example, with reference to FIG. 1, worker node 131A may be configured to include the Kafka sender 302 (Kafka source, Kafka broker, or Kafka channel), while the worker node 131B includes the Kafka receiver 304 (Kafka broker, Kafka channel, or Kafka sink). In some embodiments, the Kafka sender 302, Kafka receiver 304, and non-Kafka receiver 306 may be implemented as software executing within one or more containers in the same worker node, such as worker node 131A. Other implementations are also possible.

The sender 302 includes a Kafka dispatch service 308 that is configured to read data, in the form of records, from the topics 134. The Kafka dispatch service 308 is configured to package the data in the form of a message and send the message to a specified destination. The process and protocol used to send the message to the destination depends on whether the destination is a Kafka receiver 304 or a non-Kafka receiver 306. A Kafka receiver 304 is any component that is Kafka aware, meaning that it has a relationship to a Kafka topic so that the received message is persisted as a topic of that component. Kafka aware means that the component is a data storage component of the event streaming platform and is able to communicate using the native protocol that is native to the event streaming platform. Thus, Kafka receivers are native protocol aware and are able to communicate using the native binary Kafka protocol. Examples of Kafka receivers 304 include Kafka brokers, Kafka channels, and Kafka sinks. A non-Kafka receiver 306 is any receiver that is not Kafka aware and is therefore unable to communicate using the binary Kafka protocol. Examples, of non-Kafka receivers include applications such as Web Servers.

If the destination is a non-Kafka receiver 306, the Kafka dispatch service 308 generates a CloudEvent message from the Kafka record. In some cases, the Kafka record may be a stored CloudEvent with all of its corresponding metadata. In some cases, the Kafka record may be a Kafka binary message, in which case the Kafka record may be converted to a CloudEvent. The CloudEvent message is then send to the HTTP dispatch service 138, which sends the CloudEvent message to the HTTP ingress service 136 of the non-Kafka receiver 306 via HTTP. The HTTP ingress service 136 processes the message and delivers the data payload, i.e., the record, to the targeted application 310. The HTTP ingress service 136 may also deliver an acknowledgment to the HTTP dispatch service 138 to indicate the that the message was received. If an acknowledgement is not received, the HTTP dispatch service 138 may retry the message until an acknowledgement is received or until a specified number retries have been attempted.

If the destination is a Kafka receiver 304, the Kafka dispatch service 308 sends the record directly to the targeted topic of the Kafka receiver 304 as a binary Kafka message and the record is stored to the topic. In this way, the HTTP dispatch and HTTP ingress hops can be avoided. In some embodiments, the Kafka topic can send an acknowledgment to the Kafka dispatch service 308 to indicate that the message was received. If an acknowledgement is not received, the Kafka dispatch service 308 may retry the message until the acknowledgement is received or until a specified number retries have been attempted.

It should be noted that the Kafka receiver 304 also includes a HTTP ingress service 136. This enables the Kafka receiver 304 to maintain compliance with the Knative eventing specification, and also enables it to receive HTTP messages from other services or components. Additionally, if message delivery via the direct binary Kafka protocol is not working, the sender can initiate a fallback process wherein the sender attempts to deliver the message through the HTTP mechanism. In such instances, the Kafka dispatch service 308 converts the Kafka record to a CloudEvent message, sends it to the HTTP dispatch service 138, which sends the CloudEvent message to the HTTP ingress service 136 of the Kafka receiver 304 via HTTP, as described above for the non-Kafka receiver 306. In some embodiments, the fallback process would be initiated after a specified number of retries have been attempted in the binary Kafka protocol. It should also be noted that if the Kafka receiver 304 is a Kafka broker or Kafka channel, the Kafka receiver would also be configured to operate as a Kafka sender and would include its own Kafka dispatch service and HTTP dispatch service.

Adding the above improvements for Kafka aware components will reduce latency and reduce bandwidth consumption, since the extra HTTP roundtrip for delivering messages to the involved components can be safely skipped. At the same time, the components are still conformant to the Knative specification since the existing support for HTTP remains supported for all components that are not able to communicate through Kafka.

The determination regarding whether the receiver is Kafka aware may be performed by referring to configuration data known as an "egress contract." The egress contract resides in the sender (e.g., source, trigger, or subscription) and specifies one more referenced components (e.g., sinks) that are to receive a specific message. For example, the egress contract can identify an HTTP address, URL, IRU, or IP address of a component that is to receive the message. The egress contract can also indicate whether the referenced component is Kafka aware. For example, the egress contract may specify topic information of the referenced component, such as the URL of the Kafka broker, the topic name, and credentials. Information for populating the egress contract may be determined based on information received from the reconciler, which is described above in relation to FIG. 1. The following pseudo code describes an example process that may be implemented by the sender (e.g, reconciler of a Kafka source or the Trigger of Kafka broker):

```
func (r *Reconciler) reconcileEgress( . . . ) {
. . .
if isKafkaEnabledSink(trigger){
destination, err=resolveKafkaDestination( . . . )
if err !=nil {
return nil, fmt.Errorf( . . . )
}else {
destination, err=r.Resolver.URIFromDestinationV1( . . . )
if err !=nil {
return nil, fmt.Errorf( . . . )
}
}
. . .
trigger.Status.SubscriberURI=destination
. . .
egress:=&contract.Egress{ . . . }
. . .
}
```

Figure 4:
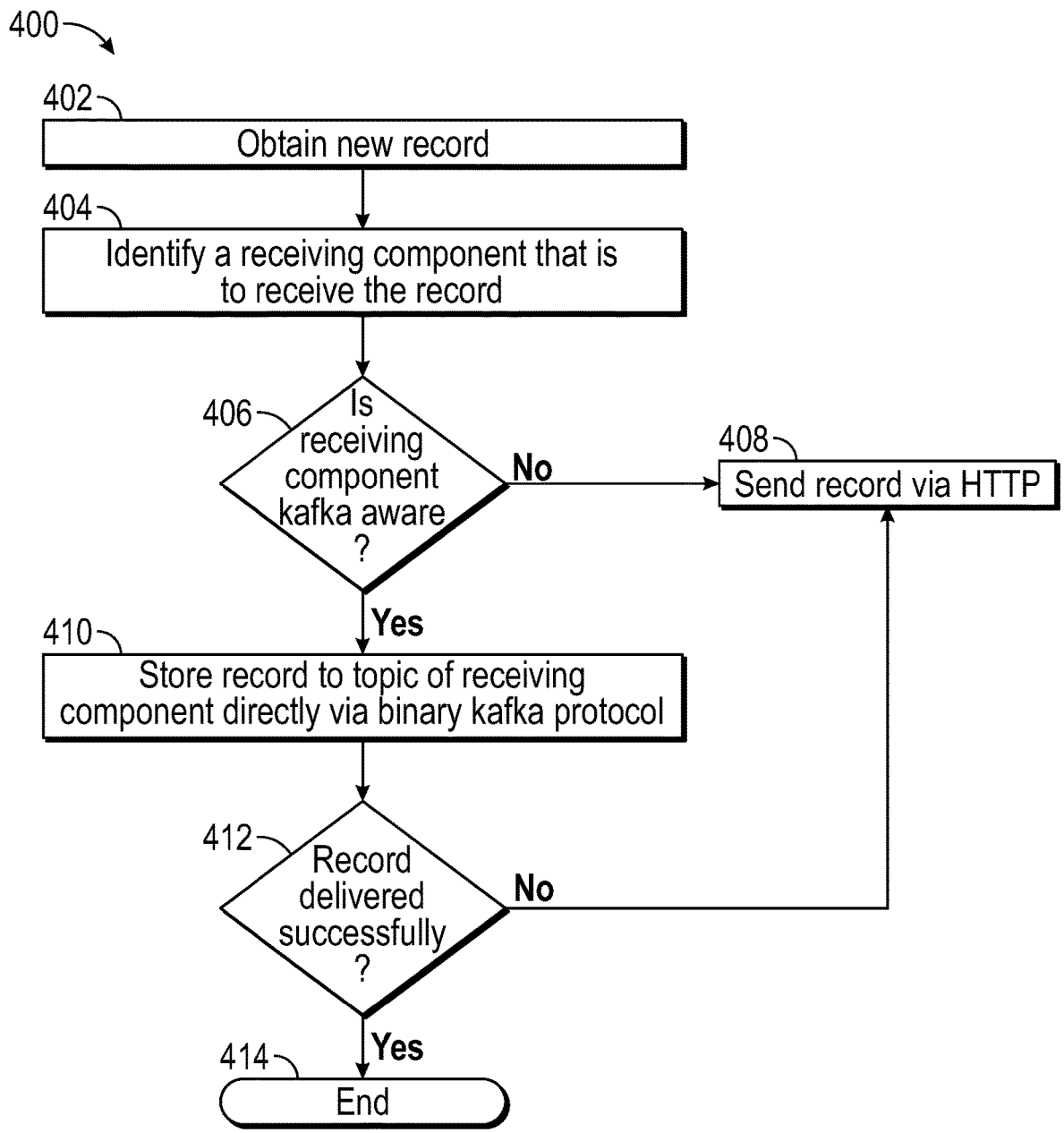
FIG. 4 is a flow diagram of a method 400 of sending Kafka massages from a Kafka component, in accordance with some embodiments of the present disclosure.

FIG. 4 is a flow diagram of a method 400 of sending Kafka massages from a Kafka component, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a cloud computing platform or a computer cluster comprising a plurality of work nodes. The method may begin at block 402.

At block 402, a new record is obtained by a Kafka component. The record may be received from another Kafka component or may be generated by an application executing on a computing device and configured to generate events to be stored to a Kafka cluster. For example, if the Kafka component is Kafka broker or Kafka channel, the record may be received from a Kafka source. If the Kafka component is a Kafka source (e.g., an event producer), the record may be generated by an application associated with the Kafka source. The record may be a record of any suitable type of event data, including sporting event data, stock market data, news, weather, measured data such as temperature data, among others.

At block 404, a receiving component is identified as a target destination for the new record. For example, the target destination may be a Kafka broker, Kafka channel, a Kafka sink, or an application running on a non-Kafka component such as a Web server.

At block 406, a determination is made regarding whether the receiving component is Kafka aware. If the receiving component is not Kafka aware, then the process flow advances to block 408 and the record is transmitted to the receiving component through HTTP. In some embodiments, the Kafka record is translated to a CloudEvent before being sent to the HTTP endpoint.

If the receiving component is Kafka aware, then the process flow advances to block 410 and the record is transmitted directly to the relevant topic of the receiving component through the binary Kafka protocol. Accordingly, the record remains formatted as a CloudEvent and is transmitted using the Kafka protocol rather than being transmitted via HTTP.

At block 412, a determination is made regarding whether the record was successfully delivered. For example, determining that the delivery was successful may include receiving an acknowledgement from the receiving component, which may be received after a number of retries have been attempted. If the record is successfully delivered, the process ends. Otherwise, if the record is not successfully delivered (e.g., no acknowledgement is received after a number of retries), the process flow advances to block 408, and the record is converted to a CloudEvent and sent via HTTP as described in relation to block 408.

It will be appreciated that the above method may be performed each time a new record is obtained. Additionally, it will be appreciated that blocks 406-412 may be repeated for each one of a plurality of receiving devices identified at block 404.

Figure 5:
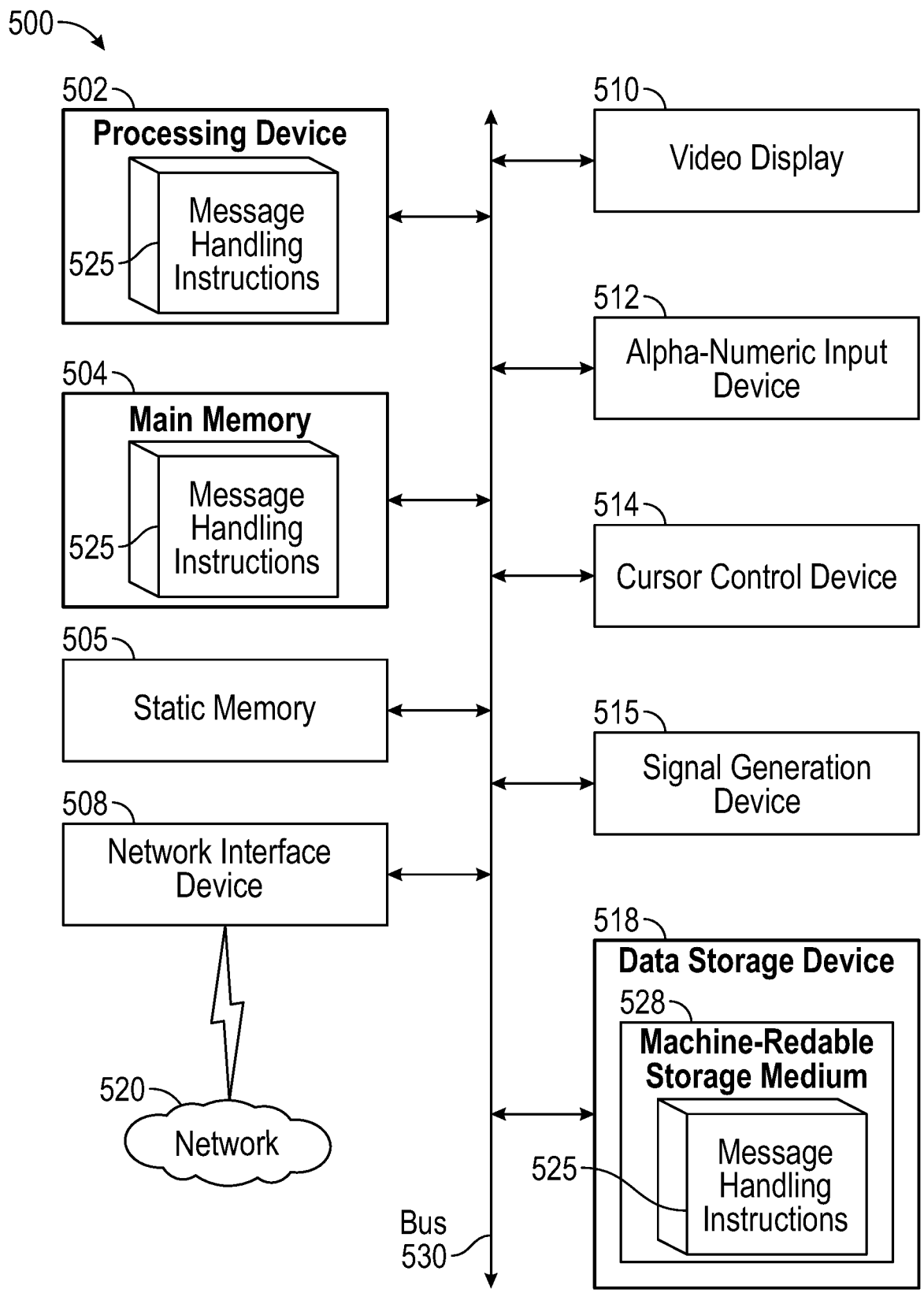
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for transferring event messages between Kafka components in a Knative Kubernetes cluster. The machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a web appliance, a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute message passing instructions 525, for performing the operations and steps discussed herein.

The data storage device 518 may include a machine-readable storage medium 528, on which is stored one or more sets of message handling instructions 525 (e.g., software) embodying any one or more of the methodologies of functions described herein. The message handling instructions 525 may also reside, completely or at least partially, within the main memory 504 or within the processing device 502 during execution thereof by the computer system 500; the main memory 504 and the processing device 502 also constituting machine-readable storage media. The message handling instructions 525 may further be transmitted or received over a network 520 via the network interface device 508.

While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   obtaining, at an event sender, a record that contains an event, wherein the event sender comprises a data storage component of an event streaming platform;
   identifying a receiving component that is designated as a receiver for the record;
   determining, by a processing device, whether the receiving component is a native protocol aware component, wherein the native protocol is native to the event streaming platform;
   upon determining that the receiving component is a native protocol aware component, sending the record to the receiving component using the native protocol; and
   upon determining that the receiving component is not a native protocol aware component, sending the record to the receiving component using Hyper Text Transfer Protocol (HTTP);
   wherein sending the record to the receiving component using the native protocol comprises bypassing an HTTP dispatch service deployed by the event sender.

2. The method of claim 1, wherein sending the record to the receiving component using HTTP comprises converting the record to a CloudEvent message.

3. The method of claim 1, wherein sending the record to the receiving component using HTTP comprises resolving a Uniform Resource Locator (URL) of an HTTP ingress service deployed by the receiving component.

4. The method of claim 1, wherein sending the record to the receiving component using the native protocol comprises resolving a Uniform Resource Locator (URL) of a target topic of the receiving component and storing the record to the target topic directly.

5. The method of claim 1, wherein sending the record to the receiving component using the native protocol comprises bypassing an HTTP ingress service deployed in the receiving component.

6. The method of claim 1, comprising:
   after sending the record to the receiving component using the native protocol, waiting to receive an indication that the record was received by the receiving component; and
   in response to determining that the indication has not been received, retry sending the record to the receiving component using the native protocol.

7. The method of claim 1, comprising:
after a specified number of re-tries, sending the record to the receiving component using HTTP.

8. The method of claim 1, wherein the event sender is a Knative Kafka source, a Knative Kafka broker, or a Knative Kafka channel.

9. A system comprising:
a memory; and
a processing device operatively coupled to the memory, the processing device to:
obtain, at the processing device, a record that contains an event;
identify a receiving component that is designated as a receiver for the record;
determine whether the receiving component is a native protocol aware component, wherein the native protocol is native to an event streaming platform;
when determined that the receiving component is a native protocol aware component, send the record to the receiving component using the native protocol; and
when determined that the receiving component is not a native protocol aware component, send the record to the receiving component using Hyper Text Transfer Protocol (HTTP);
wherein to send the record to the receiving component using the native protocol comprises to bypass an HTTP dispatch service deployed by the event sender.

10. The system of claim 9, wherein to send the record to the receiving component using HTTP comprises to convert the record to a CloudEvent message.

11. The system of claim 9, wherein to send the record to the receiving component using HTTP comprises to resolve a Uniform Resource Locator (URL) of an HTTP ingress service deployed by the receiving component.

12. The system of claim 9, wherein to send the record to the receiving component using the native protocol comprises to resolve a Uniform Resource Locator (URL) of a target topic of the receiving component and to store the record to the target topic directly.

13. The system of claim 9, wherein to send the record to the receiving component using the native protocol comprises to bypass an HTTP ingress service deployed in the receiving component.

14. The system of claim 9, wherein the processing device is to:
receive an indication from the receiving component to indicate that the record was received by the receiving component; and
if the indication is not received after a specified number of re-tries in the native protocol, send the record to the receiving component using HTTP.

15. The system of claim 9, wherein the processing device includes a Knative Kafka source, a Knative Kafka broker, or a Knative Kafka channel.

16. A non-transitory computer-readable medium, having instructions stored thereon which, when executed by a processing device, cause the processing device to:
obtain, at the processing device, a record that contains an event;
identify a receiving component that is designated as a receiver for the record;
determine, by the processing device, whether the receiving component is a native protocol aware component;
when determined that the receiving component is a native protocol aware component, send the record to the receiving component using the native protocol; and
when determined that the receiving component is not a native protocol aware component, send the record to the receiving component using Hyper Text Transfer Protocol (HTTP);
wherein to send the record to the receiving component using the native protocol comprises to bypass an HTTP dispatch service deployed by the event sender.

17. The non-transitory computer-readable medium of claim 16, wherein to send the record to the receiving component using HTTP comprises to convert the record to a CloudEvent message and resolve a Uniform Resource Locator (URL) of a Kubernetes HTTP ingress service deployed by the receiving component.

18. The non-transitory computer-readable medium of claim 16, wherein to send the record to the receiving component using the native protocol comprises to resolve a Uniform Resource Locator (URL) of a target topic of the receiving component and to store the record to the target topic directly.

19. The non-transitory computer-readable medium of claim 16, wherein to send the record to the receiving component using the native protocol comprises to bypass an HTTP ingress service deployed in the receiving component.

20. The non-transitory computer-readable medium of claim 16, having instructions stored thereon which, when executed by a processing device, cause the processing device to:
receive an indication from the receiving component to indicate that the record was received by the receiving component; and
in response to determining that the indication was not received after a specified number of re-tries in the native protocol, send the record to the receiving component using HTTP.

* * * * *